(12) United States Patent
van Berkel et al.

(10) Patent No.: US 10,599,167 B2
(45) Date of Patent: Mar. 24, 2020

(54) SYSTEM AND METHOD FOR BUILDING CLIMATE CONTROL

(71) Applicant: WATERSHED TECHNOLOGIES INC., Toronto (CA)

(72) Inventors: Samuel P. van Berkel, Toronto (CA); Douglas R. S. Hart, Toronto (CA)

(73) Assignee: WATERSHED TECHNOLOGIES INC., Toronto (CA)

( * ) Notice: Subject to any disclaimer, the term of this patent is extended or adjusted under 35 U.S.C. 154(b) by 6 days.

(21) Appl. No.: 15/667,773

(22) Filed: Aug. 3, 2017

(65) Prior Publication Data

US 2018/0039292 A1 Feb. 8, 2018

Related U.S. Application Data

(60) Provisional application No. 62/494,313, filed on Aug. 4, 2016.

(51) Int. Cl.
| | |
|---|---|
| G05D 23/19 | (2006.01) |
| F24F 11/00 | (2018.01) |
| F24F 11/83 | (2018.01) |
| F24F 11/46 | (2018.01) |
| F24D 19/10 | (2006.01) |
| F24F 11/30 | (2018.01) |
| F24F 110/10 | (2018.01) |
| F24F 11/61 | (2018.01) |

(52) U.S. Cl.
CPC ..... *G05D 23/1917* (2013.01); *F24D 19/1048* (2013.01); *F24F 11/0008* (2013.01); *F24F 11/30* (2018.01); *F24F 11/46* (2018.01); *F24F 11/83* (2018.01); *G05D 23/1932* (2013.01); *F24F 11/61* (2018.01); *F24F 2110/10* (2018.01); *Y02B 30/762* (2013.01)

(58) Field of Classification Search
CPC ............ G05D 23/1917; G05D 23/1932; F24F 11/0012; F24F 11/0008; F24F 2011/0073; F24F 11/30; F24F 11/83; F24F 11/46; F24F 2110/10; F24F 11/61; Y02B 30/762; F24D 19/1048
See application file for complete search history.

(56) References Cited

U.S. PATENT DOCUMENTS

| | | | | |
|---|---|---|---|---|
| 3,576,177 | A * | 4/1971 | Block | F24D 12/02 122/1 R |
| 4,557,417 | A * | 12/1985 | Ruby | G05D 23/1904 236/46 R |
| 4,864,972 | A * | 9/1989 | Batey | F22B 35/008 122/448.3 |
| 5,190,215 | A * | 3/1993 | Habermehl, Jr. | G05D 23/1931 165/291 |
| 8,825,215 | B2 * | 9/2014 | Boot | G01R 21/1333 700/286 |
| 9,639,413 | B2 * | 5/2017 | Drees | G05B 15/02 |

(Continued)

*Primary Examiner* — Rocio Del Mar Perez-Velez
*Assistant Examiner* — Olvin Lopez Alvarez
(74) *Attorney, Agent, or Firm* — Perry + Currier Inc.

(57) ABSTRACT

A system and method for climate control of an environment in a building are provided. The system includes a first loop and second loop for circulating a heating medium. The system also includes a boiler, an energy optimizer and a controller. The method involves circulating a heating medium, providing heat to the heating medium, and controlling the boiler based on various inputs.

18 Claims, 7 Drawing Sheets

(56) References Cited

U.S. PATENT DOCUMENTS

| | | | | |
|---|---|---|---|---|
| 9,727,063 | B1* | 8/2017 | Shilts | G05B 15/00 |
| 10,393,629 | B2* | 8/2019 | Hamouz | G01M 99/002 |
| 2011/0166913 | A1* | 7/2011 | Buchanan | G06Q 10/06 |
| | | | | 705/7.39 |
| 2012/0278038 | A1* | 11/2012 | An | G06Q 10/04 |
| | | | | 702/181 |
| 2013/0063065 | A1* | 3/2013 | Berman | H04L 12/2827 |
| | | | | 318/480 |
| 2014/0222366 | A1* | 8/2014 | Calder | F24D 19/1081 |
| | | | | 702/130 |
| 2015/0075765 | A1* | 3/2015 | Bakewell | F28F 27/00 |
| | | | | 165/287 |
| 2015/0323423 | A1* | 11/2015 | Alsaleem | F24F 3/044 |
| | | | | 62/127 |
| 2016/0097556 | A1* | 4/2016 | Seo | G05B 15/02 |
| | | | | 700/276 |
| 2016/0109866 | A1* | 4/2016 | ElBsat | G06F 17/5009 |
| | | | | 700/276 |
| 2016/0209852 | A1* | 7/2016 | Beyhaghi | G05D 23/1934 |
| 2016/0334122 | A1* | 11/2016 | Shiel | F24F 11/0001 |
| 2017/0219219 | A1* | 8/2017 | Miller | F24D 19/1012 |
| 2018/0066854 | A1* | 3/2018 | Gagne | F24D 19/1009 |
| 2018/0196451 | A1* | 7/2018 | Holub | G05D 23/1923 |
| 2018/0372341 | A1* | 12/2018 | Rehor | F24D 19/10 |
| 2019/0033811 | A1* | 1/2019 | Nayak | G05B 15/02 |

* cited by examiner

SYSTEM AND METHOD FOR BUILDING CLIMATE CONTROL

CROSS-REFERENCE TO RELATED APPLICATIONS

This application claims priority to U.S. Provisional Application No. 62/494,313, titled "INTERVAL DATA OPTIMIZATION: A NEW METHODOLOGY FOR BUILDING CONTROL" and filed on Aug. 4, 2016, the entire contents of which are incorporated herein by reference.

FIELD

The present disclosure relates to reducing energy consumption and more specifically to reducing energy consumption for climate control in buildings.

BACKGROUND

Many multi-residential buildings built during the 20$^{th}$ century include no suite-level temperature control. Building temperature control is achieved by varying the temperature of the hydronic heating medium leaving the central plant. Control of the heating medium temperature is achieved using an "outdoor reset curve", which defines the relationship between outdoor temperature and the temperature of the heating medium. For example, during a winter day the heating system control might measure an outdoor temperature of −10° C., and then use the outdoor reset curve to determine a suitable heating medium setpoint temperature of 70° C. The heating system control would then modulate the boiler plant output to maintain the heating medium temperature at this setpoint.

The outdoor reset curve is typically a linear relationship based on subjective values assigned by the technician when commissioning the heating control systems. The settings are rarely reviewed, and there is typically no systematic process or feedback for adjusting the outdoor reset curve. As a result, conventional heating control systems can result in wasted energy, unnecessary costs and greenhouse gas emissions.

SUMMARY

In accordance with an aspect of the invention, there is a system for climate control of an environment in a building. The system includes a first loop for circulating a heating medium. The system also includes a boiler disposed in the first loop. The boiler is for providing heat to the heating medium. The system further includes a second loop in thermal communication with the first loop, wherein the second loop circulates the heating medium for controlling a climate of the environment. In addition, the system includes a controller configured to control the boiler and to receive data from the first loop and the second loop, wherein the controller controls the boiler based on the data to maintain a temperature setpoint. Furthermore, the system includes an energy optimizer connected to controller and configured to receive input from an energy meter, wherein the energy optimizer determines the temperature setpoint based on the input from the energy meter.

The heating medium may flow between the first loop and the second loop.

The system may further include a valve configured to regulate flow of the heating medium between the first loop and the second loop.

The valve may be controlled by the controller.

The system may further include an outdoor sensor in communication with the energy optimizer, wherein the outdoor sensor may be configured to measure a temperature outside the building.

The energy optimizer may be configured to calculate an energy rate setpoint based on the temperature outside the building.

The energy optimizer may determine the temperature setpoint by comparing the energy rate setpoint and the input from the energy meter.

The energy optimizer may adjust the temperature setpoint to maintain a difference between the energy rate setpoint and the input from the energy meter within a predetermined threshold.

The energy optimizer may be configured to determine a basic level of energy consumption, the basic level of energy consumption being subtracted from the difference.

The system may further include a memory storage unit configured to store a table, wherein the table is configured to provide historical data to the energy optimizer.

In accordance with an aspect of the invention, a method of climate control of an environment in a building is provided. The method involves circulating a heating medium in a first loop and a second loop, the second loop in thermal communication with the first loop, wherein the second loop circulates the heating medium for controlling a climate of the environment. In addition, the method involves providing heat to the heating medium using a boiler disposed in the first loop. The method further involves receiving data, at a controller, from the first loop and the second loop. The method also involves controlling the boiler with the controller based on the data to maintain an initial temperature setpoint. Furthermore, the method involves receiving input from an energy meter at an energy optimizer. Also, the method involves determining an updated temperature setpoint using the energy optimizer based on the input from the energy meter.

The method may further involve directing the heating medium to flow between the first loop and the second loop.

Directing may involve regulating flow of the heating medium between the first loop and the second loop using a valve.

The method may further involve directing controlling the valve using the controller.

The method may further involve measuring a temperature outside the building using an outdoor sensor, wherein the outdoor sensor is in communication with the energy optimizer.

The method may further involve calculating an energy rate setpoint using the energy optimizer, the energy rate setpoint based on the temperature outside the building.

Determining the updated temperature setpoint may involve comparing the energy rate setpoint and the input from the energy meter.

The method may further involve maintaining a difference between the energy rate setpoint and the input from the energy meter within a predetermined threshold.

The method may further involve subtracting a basic level of energy consumption from the difference.

In accordance with an aspect of the invention, a non-transitory computer readable medium encoded with codes is provided. The codes are for directing a processor to operate a controller to circulate a heating medium in a first loop and a second loop, the second loop in thermal communication with the first loop, wherein the second loop circulates the heating medium for controlling a climate of the environment. The codes are also for directing a processor to provide heat to the heating medium using a boiler disposed in the first loop. In addition, the codes are for directing a processor to receive data from the first loop and the second loop. Furthermore, the codes are for directing a processor to control the boiler based on the data to maintain an initial temperature setpoint. Additionally, the codes are for directing a processor to receive input from an energy meter. The codes are also for directing a processor to determine an updated temperature setpoint based on the input from the energy meter.

DETAILED DESCRIPTION

Figure 1:
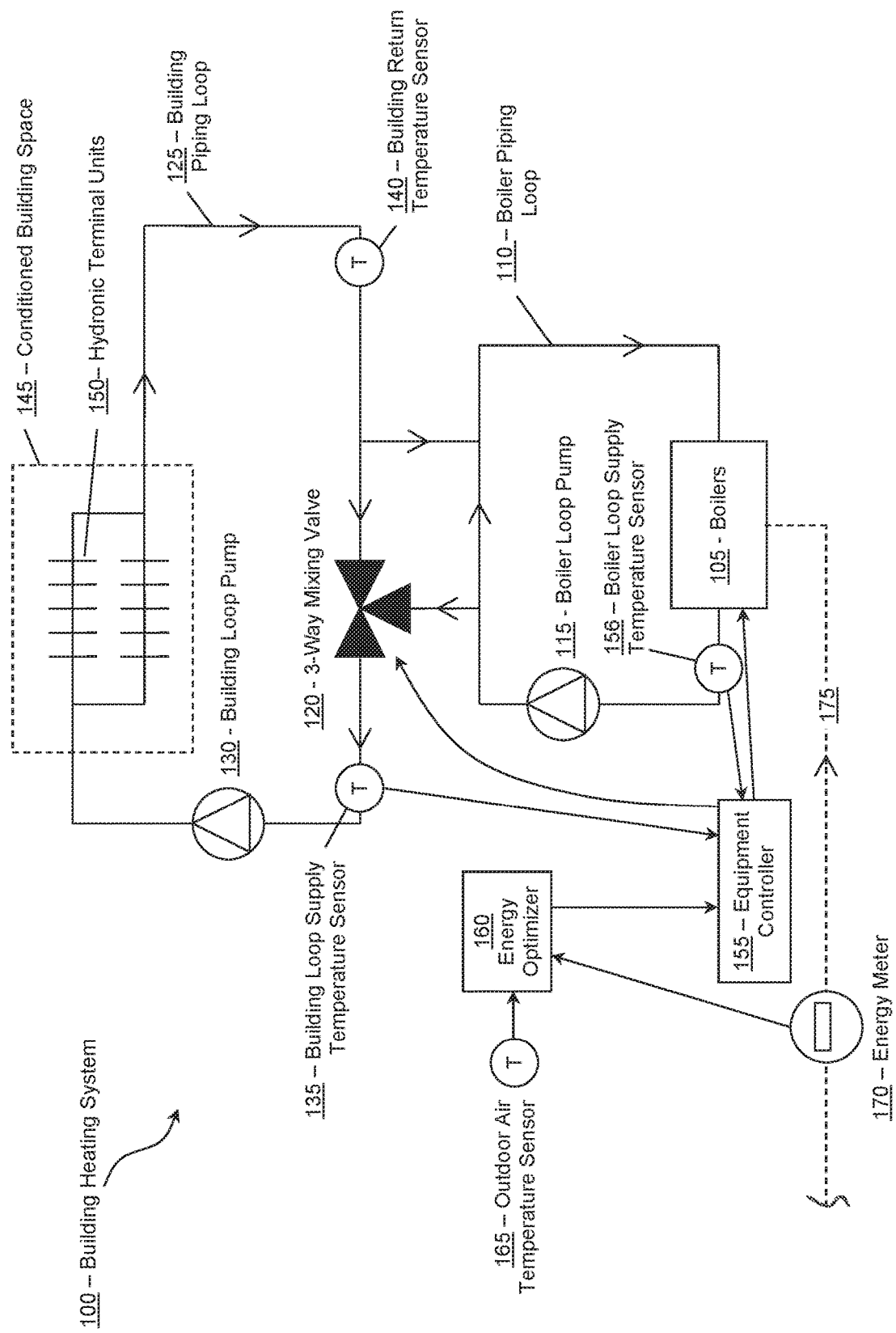
FIG. 1 illustrates a schematic of a building heating system, according to an embodiment of the present invention.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

The following description includes examples of optimizing the energy consumption rate for a building heating system, but a person of skill in the art, with the benefit of this disclosure, will appreciate that the current disclosure can also apply to building cooling systems.

Definitions

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, "outdoor reset curve" or "reset curve" means the relationship (either linear or non-linear) used by a space heating or cooling control system to calculate a setpoint temperature for a heating or cooling medium (typically water), based on the outdoor air temperature.

As used herein, "interval energy consumption data" or "interval data" means energy consumption data that is totalized and recorded at intervals of less than a month, typically daily or hourly.

As used herein, "hydronic terminal unit" means any hydronic terminal device used for heating or cooling including fintube convectors, radiators or fancoil units.

As used herein, "de-coupled" or "de-coupling" refers to a heating system configuration in which the building heating loop is separated from the boiler heating loop, allowing the boiler heating loop to be maintained at a higher temperature than the building heating loop.

As used herein, "interval data optimization" or "IDO" means the process of using interval data and outdoor temperature to determine the minimum energy input to the space heating/cooling system required to maintain indoor temperatures within the generally accepted range (typically about 21° C. to about 25° C.), and using that energy consumption requirement to optimize operation of the space heating/cooling system such that the energy consumption requirement is substantially met but not exceeded.

As used herein, "setpoint" means a target temperature or target energy consumption rate at which the respective system component is to be maintained. Because of changing demand on the heating/cooling system and because many types of heating/cooling equipment have discrete levels of output, it is rarely possible to maintain the actual temperature or energy consumption rate exactly at the setpoint. Instead actual temperature or energy consumption rate values typically oscillate slightly above and below their setpoint, with the average values approximating the setpoint.

As used herein, "PID loop" means proportional-integral-derivative control loop. A PID loop is a control algorithm used to regulate a process variable such as temperature or flow by adjusting an output variable. The output variable may be an equipment setting, such as a valve position or boiler firing rate, or may be an intermediate variable such as a setpoint temperature, which is used in another step in the control process.

As used herein, "DDC" means direct digital controller. A DDC is a programmable electronic device which typically includes a microprocessor in combination with hardware for reading sensor data and controlling equipment via analog or digital outputs. DDCs are used in building automation to control equipment such as valves, boilers, pumps and fans.

As used herein, the term "balance outdoor air temperature" or "balance temperature" means, in the case of heating, the outdoor temperature above which the building requires no heat from the space heating system. Alternatively, in the case of cooling, the term means the outdoor temperature below which the building requires no cooling from the space cooling system. Typically, the heating balance temperature in older multi-residential buildings is about 16° C. because other factors contribute to heating within the building, which are sufficient to provide a comfortable indoor environment (typically about 21° C. to about 25° C.). These factors include internal heat gains from electrical loads, human metabolic processes and solar gains.

As used herein, the term "design temperature" means the most extreme (coldest or hottest) outdoor air temperature associated with the building's outdoor environment. The exact value may differ depending on the application and the confidence interval desired. The design temperature typically reflects the maximum energy output for that system.

Embodiments

This specification describes a system and method for assessing the performance of an existing building heating/cooling control system and for implementing a more efficient control process using interval energy consumption data. The method is termed Interval Data Optimization, or IDO. A presently preferred area of application is older multi-residential (apartment) buildings, where there is limited or no suite-level temperature control (for example, where there are no in-suite thermostats or the majority of in-suite thermostats do not function properly). The IDO method is based on an approximately linear relationship between the required heating/cooling energy consumption rate and the outdoor temperature. For example, during the heating season, the inventors have noted that an approximately linear relationship exists between the outdoor temperature and the energy consumption rate that is required for space heating.

1. System for Optimized Heating Control with Interval Data Optimization (IDO)

FIG. 1 is a schematic representation of a non-limiting example of the building heating system 100 incorporating Interval Data Optimization. One or more boilers 105 heat a heating medium, typically water, which is circulated through a boiler loop 110 by a boiler loop pump 115. A 3-way mixing valve 120 regulates the flow of hot water from the boiler loop 110 to the building loop 125, where circulation is provided by a building loop pump 130. A building supply temperature sensor 135 and building return temperature sensor 140 provide feedback used to adjust the position of the 3-way mixing valve 120.

Heat is conveyed to the conditioned building spaces 145 by hydronic terminal units 150. In many older multi-residential (apartment) buildings, the hydronic terminal units 150 are baseboard convectors or radiators without individual control valves and the conditioned building spaces 145 (the residential suites) do not have individual temperature controls. In this configuration, the rate of heat delivery is primarily a function of the hot water supply temperature in the building loop 125 circulating through the hydronic terminal units 150.

The equipment controller 155 and energy optimizer 160 are typically direct digital controllers (DDCs), but could also be other types of programmable hardware such as programmable logic controllers (PLCs) or microcontrollers. The controller 155 and energy optimizer 160 may have a storage device or computer readable medium encoded with codes representing programming instructions to carry out various functions. The equipment controller 155 is connected via electronic communication links to the boilers 105 and the 3-way mixing valve 120, as well as the boiler loop supply temperature sensor 156, the building loop supply temperature sensor 135 and the energy optimizer 160. The energy optimizer 160 is connected via electronic communication links to the equipment controller 155, an outdoor air temperature sensor 165 and the energy meter 170

In the principal embodiment of the invention, the energy meter 170 is installed on the energy input piping or pathway 175 to the building and to the boilers 105. In this embodiment, there is a continuous electronic connection between the energy meter 170 and the energy optimizer 160, typically via a pulse output signal. In other embodiments, the energy meter 170 can communicate with the energy optimizer 160 via a network connection, such as the Internet or Intranet system. The energy meter 170 may also be read at a remote location, such as from a utility data collection system which collects data from the energy meter 170 and stores it in a central server (not shown).

To reduce costs, the existing gas meter which measures the total gas consumption of the building is normally used as the energy meter 170, but this meter may also include other gas loads in addition to space heating. Depending on the relative significance of these loads, it may be more accurate to estimate their consumption and remove them from the total consumption measured by the meter.

In a variation, a separate energy meter 170 can be installed for the space heating boilers 105. This allows for direct isolation of space heating energy without the need to estimate non-space heating loads. Installing a separate gas meter may also be useful in situations where two buildings with separate heating systems share a common natural gas meter, in which case it can be difficult to adjust heat output of each individual heating system without separate energy consumption feedback.

In another embodiment, the energy meter 170 can be substituted with measurements of the difference between the building loop supply temperature sensor 135 and the building loop return temperature sensor 140, indicating the change in temperature of the heating medium circulating in the building loop 125. In typical heating systems where water flow remains relatively constant, the temperature difference between the supply water to the building and the return water from the building back to the heating plant can be a good indicator of the delivered energy. Integrating the temperature difference over a fixed period (for example, one hour or one day) can provide interval energy consumption data. This alternate system for measuring energy output allows the control to directly isolate energy for space heating without having to install additional metering equipment or estimate non-space heating loads.

By incorporating energy consumption feedback from the energy meter 170 as additional information, the energy optimizer 160 overcomes the limitations of various conventional heating control systems which often result in overheating and energy waste.

In another embodiment of the invention, the function of the energy optimizer 160 may be integrated with the equipment controller 155 such that the two are contained within the same physical device. In this embodiment, the integrated device would receive input from the outdoor air sensor 165, the energy meter 170, the building supply temperature loop supply temperature sensor 135 and the boiler loop supply temperature sensor 156.

In yet another embodiment, the energy optimizer 160 could be an offsite device, in which case the connections to outdoor temperature sensor 165, the energy meter 170 and the equipment controller 155 would be over the Internet. In this embodiment, the outdoor temperature sensor 165 could also be part of a separate weather station and not necessarily located directly at the building.

It is to be understood that other variations of the configuration of the boiler loop 110, building loop 125 and 3-way mixing valve 120 are possible. The purpose of the two piping loops is to protect the boilers 105 from low temperature (typically below around 55° C.) inlet water. Many boilers require a minimum inlet temperature to prevent the products of combustion from condensing and creating corrosive conditions within the boiler. In the system 100, the configuration of the 3-way mixing valve 120 and the two different loops 110, 125 allow the building loop 125 to operate at lower temperatures without causing condensation in the boilers 105. The heating medium circulating in the boiler loop 110 is maintained above the condensing temperature, while at the same time allowing a lower temperature in the building loop 125. In this way, the building loop 125 is de-coupled from the boiler loop 110. This is also known as a primary-secondary piping arrangement. It is also to be understood that other variations of this system for de-coupling the building loop 125 and boiler loop 110 are possible, including variations using injection pumps or thermostatic boiler protection valves. It is also to be understood that there are other system variations in which de-coupling may not be necessary. For example, if the boilers 105 are high-efficiency condensing models they are typically constructed to tolerate low water temperatures, and in fact perform better in these conditions. In this variation of the system 100, de-coupling of the building loop 125 and the boiler loop 110 is typically not required.

Although a building heating system 100 has been shown for illustrative purposes, a person skilled in the art will now recognize that system 100 can be modified to control a central cooling system. Existing central cooling systems often exhibit a large overhead or 'jump' in energy consumption when the system is first engaged. This discontinuity represents excess cooling energy output and is an opportunity for energy savings. However, in such a cooling variation, the energy meter 170 would be an electricity meter, rather than a natural gas meter.

2. Method for Optimized Heating Control with Interval Data Optimization (IDO)

Through tracking interval energy consumption data, IDO, as taught herein, makes it possible to optimize the heating/cooling system control to provide improved energy efficiency, as well as more comfortable indoor temperatures. The control method is based on an approximately linear relationship that should exist between the required energy consumption rate and the outdoor temperature, which stems from the principle that heat transfer in buildings is largely proportional to the difference between the inside and outside temperatures.

Figure 2:
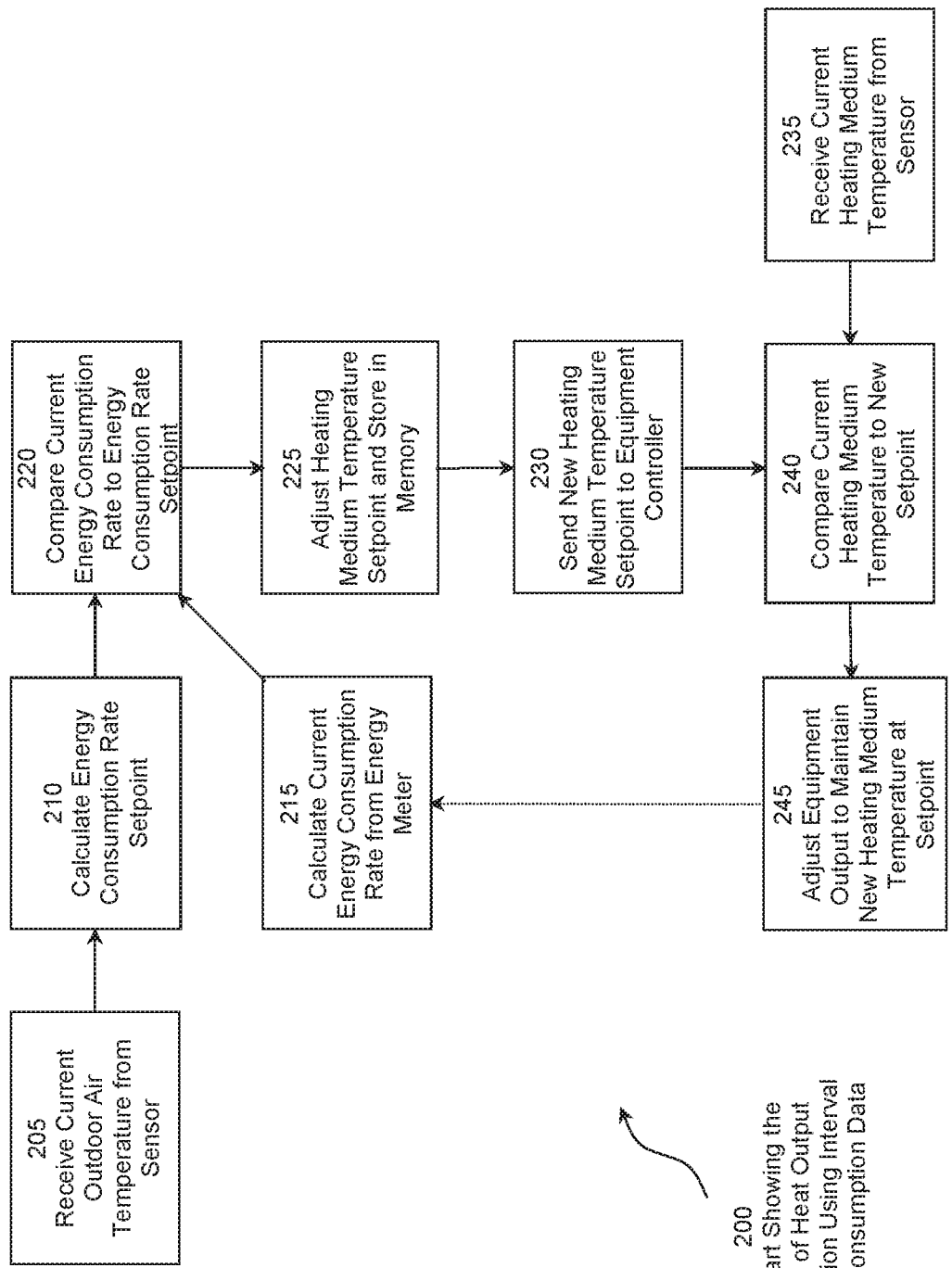
FIG. 2 provides a flowchart illustrating the method of heat output optimization using interval energy consumption data, according to an embodiment of the present invention.

Referring to FIG. 2, a method for projecting energy savings from IDO is represented in the form of a flow chart as indicated generally at 200. (A person skilled in the art will recognize, with the benefit of this specification, that method 200 can be used to operate system 100 or variants thereon. Likewise, the method 200 can have variants that will operate system 100 or its variants.) Block 205 comprises receiving the current outdoor air temperature from an outdoor air temperature sensor. When method 200 is used to operate system 100, the outdoor air temperature sensor at block 205 is outdoor air temperature sensor 165. Thus, at block 205 the information from the outdoor air temperature sensor 165 is received and, at block 210, used to calculate an energy consumption rate setpoint which represents the optimized performance point of the building heating system 100 at the given outdoor temperature.

During an initial operation of method 200, at block 215 the energy optimizer 160 uses data from the energy meter 170 to calculate the current energy consumption rate. Subsequently at block 220, the energy optimizer 160 compares the current energy consumption rate to the energy consumption rate setpoint.

When using the main building gas meter as the energy meter 170, the energy consumption data may also include other gas loads in addition to space heating. Depending on the relative significance of these loads, it may be beneficial to estimate (or, if resources permit, actually determine) their consumption and remove them from the total consumption measured by the meter. The most common example of another gas load is gas that is used for heating domestic hot water, which can vary seasonally because of changes in ground temperatures, but can also lag behind seasonal changes in outdoor air temperature. Gas for domestic hot water heating can be modelled with a sinusoidal function which is calibrated during the non-heating season, and then used to isolate the space heating component of the total metered gas consumption during the heating season. While this process may improve the accuracy of the adjustment process, the correction is not typically a strict requirement to achieve benefits from the present invention.

At block 225 the energy optimizer 160 adjusts the heating medium temperature setpoint based on the comparison at block 220, reducing the difference between the current energy consumption rate and the energy rate setpoint. This is typically accomplished with a control algorithm such as a PID loop. After sufficient iterations of the process such that the energy consumption rate received at block 215 averages within about 5% of the energy consumption rate setpoint calculated at block 210, the resultant building heating medium temperature setpoint and outside air temperature are stored in memory and a table is built.

The table of stored temperature setpoints and outside air temperatures is particularly useful in cases where the system is shut down and has to re-start, in which case the energy optimizer 160 can send an initial heating medium temperature setpoint to the equipment controller 155, reducing the number of iterations of the process required for the average energy consumption rate to reach within about 5% of the energy consumption rate setpoint.

The table can also be useful if the connection to the energy meter 170 is interrupted, in which case the energy optimizer 160 can rely on previously stored heating medium temperature setpoints to provide to the equipment controller 155 until the connection to the energy meter 170 is restored. (In a presently less preferred embodiment it is possible to remove or abandon connection to the energy meter 170 after a period of operation of the system 100, in which case the heating medium temperature setpoints can be based on the table of previously stored temperature setpoints and outside air temperatures. The period of operation before the energy meter 170 is disconnected would have to include a range of outdoor temperatures, ideally from the balance temperature to the design temperature. Even so, while still advantageous, this embodiment may not be as adaptable to equipment changes or other issues and may result in increased energy consumption relative to the preferred embodiment.)

Block 230 comprises sending the heating medium temperature setpoint to the equipment controller 155 from the energy optimizer 160. At block 235 the equipment controller 155 receives the current heating medium temperature from the building loop supply temperature sensor 135. At block 240 the equipment controller 155 compares this current temperature to the temperature setpoint received from the energy optimizer 160. At block 245 the equipment controller 155 adjusts the equipment output to maintain the heating medium temperature at the setpoint. Adjusted equipment typically includes the boilers 105 and the 3-way mixing valve 120.

After block 245, method 200 cycles back from block 245 to block 215 at which point the process cycles as indicated in FIG. 2, such that the heating system output is continuously adjusted and the actual energy consumption rate approaches the energy consumption rate setpoint.

Figure 3:
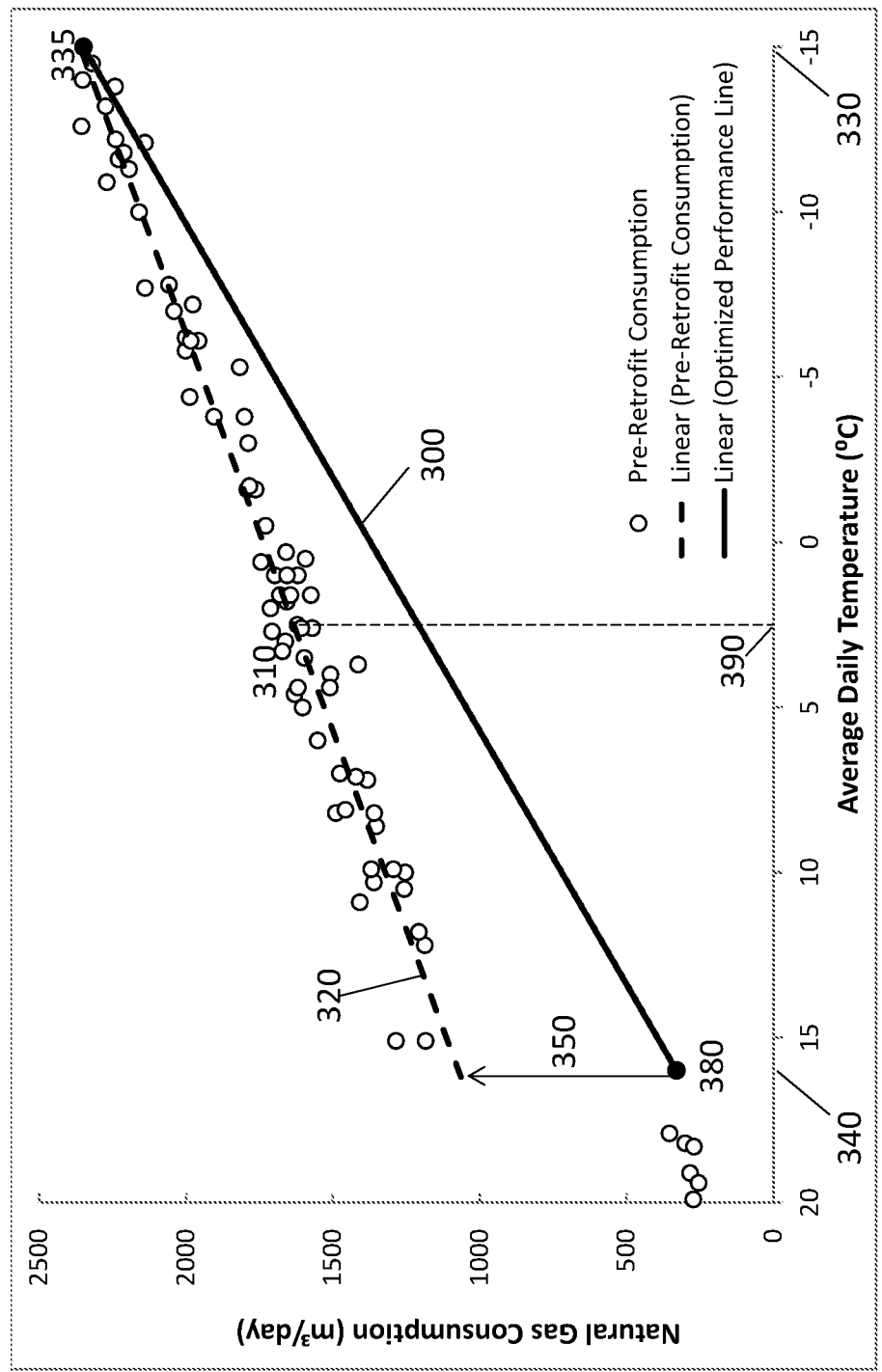
FIG. 3 illustrates a graph representing an optimal energy consumption rate from historical energy consumption data that can be used in conjunction with the method of FIG. 2 and the energy optimizer of FIG. 1.

FIG. 3 illustrates the graph that can that can be used to determine the optimized performance line 300, from which the energy consumption rate setpoint is calculated at block 210. The graph in FIG. 3 plots daily natural gas consumed (Y-axis) against mean daily outdoor temperature (X-axis). Data points 305 and data points 310, both represented by hollow circles, show the historical daily energy consumption for a building prior to the implementation of system 100. Each point indicates one day of energy use. Data points 305 represent those days in the historical period when the outdoor temperature is above the balance temperature (about 16° C. in this case) and natural gas is only used for non-space heating functions such as domestic hot water heating. Data points 310 represent gas consumption for days in the historical period when the space heating system is on (typically because the outdoor air temperature is below the balance temperature). A dashed trend line 320 representing the best-fit to the historical energy consumption is calculated using simple linear regression analysis utilizing data points 310.

The coldest outdoor temperature, for which a building heating system is designed, is referred to as the design temperature. The design temperature 330 depends on the local climate and in the example illustrated in FIG. 3 is about −15° C. The heating system will have maximum output at the design temperature, which is represented at reference character 335 in FIG. 3. Thus, the energy consumption rate at the design outdoor air temperature defines the maximum energy consumption rate, as represented on the y-Axis labelled "Natural Gas Consumption (m³/day)" of FIG. 3, for the building heating system.

The outdoor temperature where a building no longer needs heat from the heating system is known as the "balance outdoor air temperature" or "balance temperature", typically about 16° C., which is indicated at reference character 340 on the x-axis of FIG. 3. The balance temperature 340 corresponds to an outdoor air temperature at which no external energy source is needed to heat or cool the building to provide a comfortable indoor building temperature for the building occupants. In short, at the balance temperature 340, the heating or cooling system is "off". For a heating system, this is also referred to as "warm weather shutdown temperature", at or above which the heating system is turned off. (There may still be a basic level of energy consumption at the balance temperature as a result of other loads. For example, natural-gas based heating systems may still have a basic level of gas consumption throughout the summer as a result of the domestic hot water heating system or the operation of gas clothes dryers in the central laundry room.)

The projected optimized system performance curve is represented by a solid black line indicated at reference character 300. Optimized system performance line 300 is the line drawn between the maximum energy point 335 and the minimum energy consumption point 380, demonstrating the target linear relationship represented by the line 300 that exists between the daily building energy consumption and outdoor temperature when heating system 100 is optimized according to the teachings herein. The maximum energy consumption point 335 is the energy used at the design temperature 330. The minimum energy consumption point 380 is the energy used at the balance temperature 340, while the space heating boilers 105 are inactive.

By plotting a straight line from the balance temperature point 380 to the design temperature point 335, line 300 is established for the optimal energy consumption rate for any given outdoor air temperature between the balance outdoor air temperature 340 and the design outdoor air temperature 330. The line 300 can be used to determine the optimal energy consumption rate for a given outdoor temperature and applied within method 200. In the present example, the line 300 is straight; however, it is to be appreciated by a person of skill in the art with the benefit of this description that the line 300 can be substituted with a curve, or other non-linear relationship such as a seasonal adjustment for domestic hot water load due to ground water temperature variations.

Implementation Example

Figure 4:
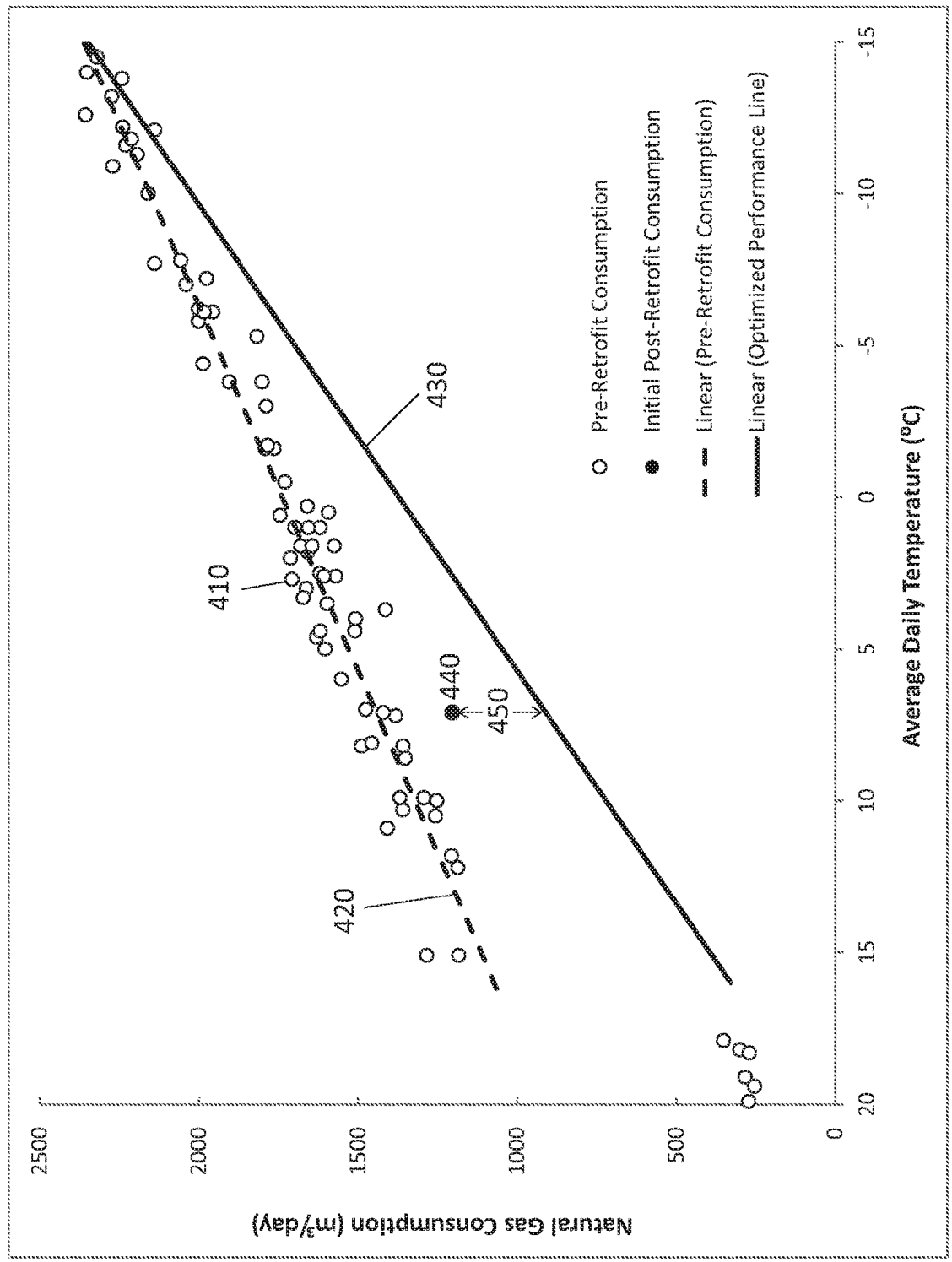
FIG. 4 illustrates a graph that can be used in conjunction with the method of FIG. 2 and the energy optimizer of FIG. 1 which represents adjustments to heating system energy output based on energy consumption feedback.

FIG. 4 illustrates an example where method 200 is implemented in an older multi-residential building using daily data. Daily natural gas consumption (m³/day) is plotted on the Y-axis against average daily outdoor air temperature (° C.) on the X-axis. The pre-retrofit natural gas consumption during the space heating period is shown as data points 410 (represented as hollow circles indicated at reference 410 in FIG. 4). Each data point 410 represents one day and the dashed trend line 420 represents a best fit linear model during active space heating, derived through linear regression. In this example, the pre-retrofit trend line is described by the equation where X represents the average daily temperature (° C.) and Y represents the daily gas consumption (m³/day):

$$Y[m^3/day]=-41.6(X[° C.])+1738 \quad \{Eq. 1\}$$

The optimized performance line 430 is shown in solid black, and is developed as described in the previous section. In this example, the optimized performance line is described by the equation:

$$Y[m^3/day]=-62.9(X[° C.])+1356 \quad \{Eq. 2\}$$

In FIG. 4, a one day period shortly after IDO was first implemented is represented by a single black point 440. The average daily temperature on this day was about 7.1° C. and the natural gas consumption was about 1205 m³/day. The optimized natural gas consumption rate at the same daily temperature can be calculated from Equation 2 with X=7.1° C.

$$Y=-62.9(7.1° C.)+1356=909 \ m^3/day$$

Line 450 indicates the difference between the actual natural gas consumption rate (about 1205 m³/day) indicated at 440 and the optimal natural gas consumption rate (about 909 m³/day) indicated by the curve 430. (The person skilled in the art will recognize that curve 430 is analogous to line 300 in FIG. 3). In this case the difference indicated at 450 is 296 m³/day, which is about 33% of the optimal natural gas consumption rate. This feedback can then be incorporated into the control algorithm's iterative process contained within the energy optimizer 160, reducing the hot water supply temperature setpoint, which in turn reduces the heating system energy output.

It is to be re-emphasized that the values of the slope and intercept in Equations 1 and 2 are specific to a particular building and will vary according to the building in which system 100 is implemented.

In some cases, when initially commissioning a new heating system with the energy optimizer, it may be desirable to reduce the heat output in small increments over a number of days or weeks, even if it means using more energy than indicated by curve 430 for this period. This provides time for the transition from the pre-retrofit performance to the optimized performance, and allows building occupants, who may have become accustomed to higher indoor temperatures, an opportunity to adjust.

Figure 5:
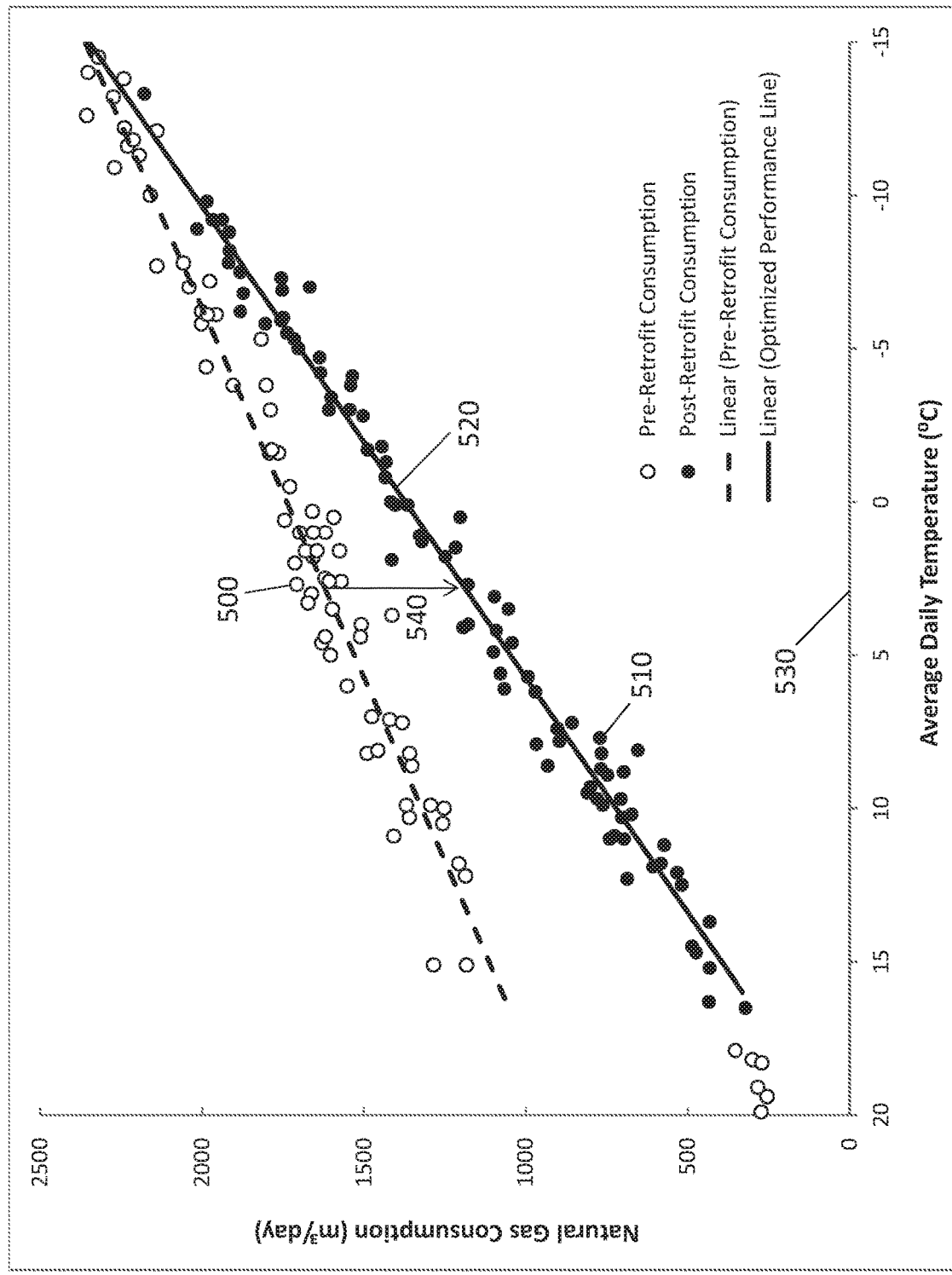
FIG. 5 illustrates a graph representing typical post-retrofit results after implementing the method of FIG. 2 and the system of FIG. 1.

In FIG. 5 the pre-retrofit period is shown in data points 500, represented by hollow circles, while an after-retrofit period of several months is shown with data points 510, represented by solid circles. These data points 510 exclude the initial adjustment period, and instead represent the fully-optimized performance after the initial adjustment process is complete. While there is minor day-to-day variation in gas consumption due to secondary effects such as wind, solar gains or other factors, the data points generally conform to the optimized performance curve 520.

The annual natural gas savings for a typical year can be calculated by subtracting Equation 2 from Equation 1 at the average heating season temperature 530. For Toronto, Canada, a typical heating season has about 238 days with heating that have an average temperature of about 2.7° C. Therefore, in this example, the natural gas savings are calculated as:

$$\{[-41.6(2.7° C.)+1738]-[-62.9(2.7° C.)+1356]\}(238 \text{ days}) = 104{,}603 \text{ m}^3/\text{year}$$

In this case, the annual natural gas savings indicated by the line at 540 represent about 30% of the building's annual space heating load, which is within the typical range of about 15% to about 40% achieved in past implementation in other buildings. In addition to energy savings and significant $CO_2$ emissions reduction, a more comfortable indoor environment is provided, reducing overheating and the need to open windows to cool overheated suites. In this way, an excellent opportunity for resource conservation is provided, while reducing greenhouse gas emissions and offering an attractive financial investment.

3. System for Building Performance Analysis

Through a system of regression analysis of the historical daily energy consumption plotted against mean daily outdoor temperature, system 600 and its variants can be used to identify and quantify opportunities for energy conservation in a building or among a group of buildings.

Figure 6:
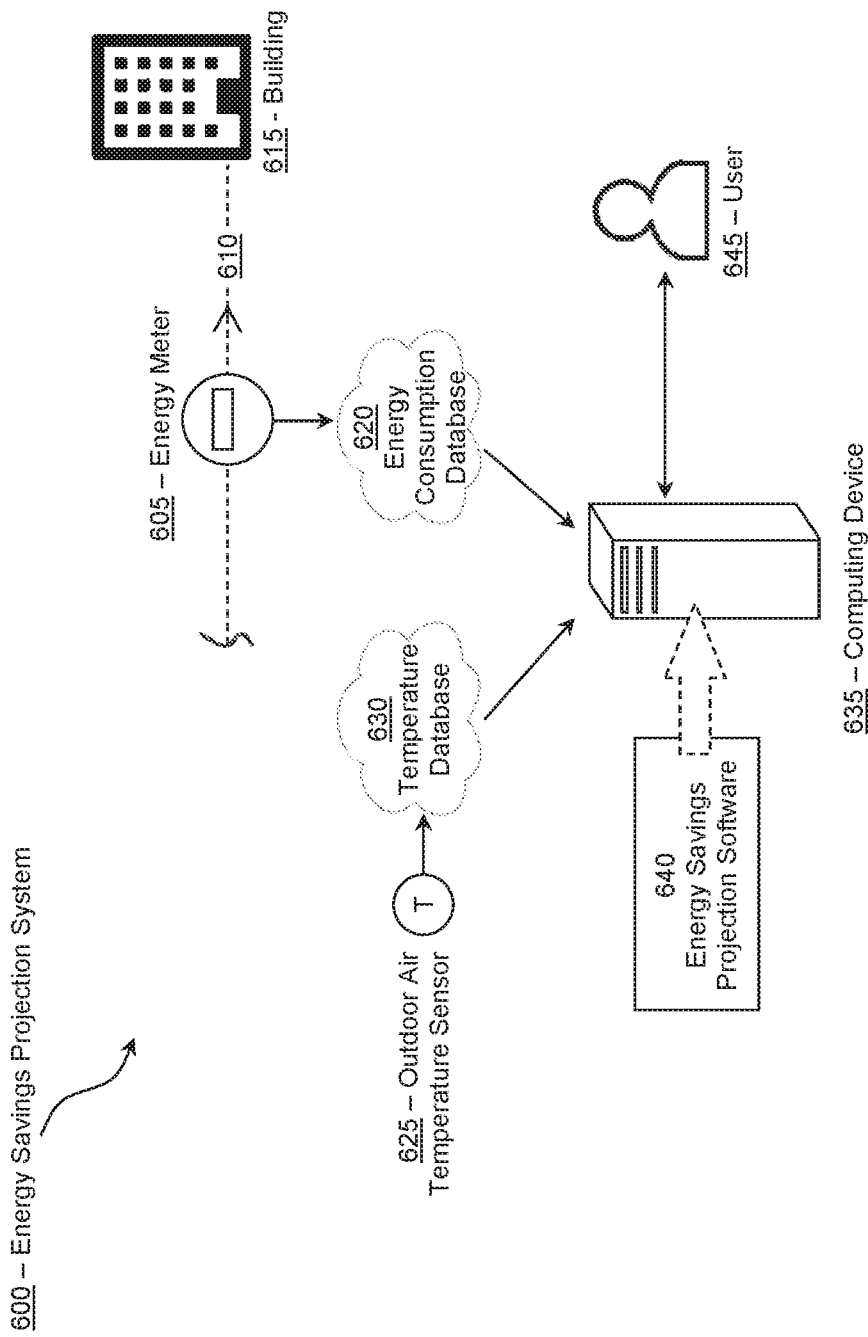
FIG. 6 illustrates a schematic of a system for projecting energy savings from Interval Data Optimization, according to an embodiment of the present invention.

FIG. 6 is a schematic representation of a non-limiting example of an energy savings projection system 600. The energy meter 605 is installed at the input energy pathway 610 to the building 615, and linked to an energy consumption database 620. The input energy pathway 610 corresponds to the fuel used for space heating or space cooling, typically natural gas for heating and electricity for cooling.

The energy meter 605 is typically the same meter used by the energy supplier to bill the building owner for their energy consumption, but may also be a separately installed energy meter or other system for measuring or approximating energy consumption of the heating or cooling system.

The energy consumption database 620 can take a variety of forms, including a database maintained by the energy supplier or by another entity collecting energy consumption data for the building. Often the energy consumption database 620 is online and can be accessed through an FTP (File Transfer Protocol) client or web browser.

The outdoor temperature sensor 625 can be part of an existing weather station operated by a public agency, with the outdoor temperature database 630 being the public agency's website where the data is made available. It is not critical that the weather station be located within close proximity to the building, as long as the location of the weather station experiences the same general trends in outdoor temperature as the location of the building. Typically, any weather station within the same city is acceptable.

The computing device 635 is linked to the energy consumption database 620 and the outdoor temperature database 630, typically over the internet. The computing device 635 contains the energy savings projection software 640. The system user 645 may interact with computing device 635 and software 640 by receiving information and inputting software configuration settings.

4. Method for Building Performance Analysis

Figure 7:
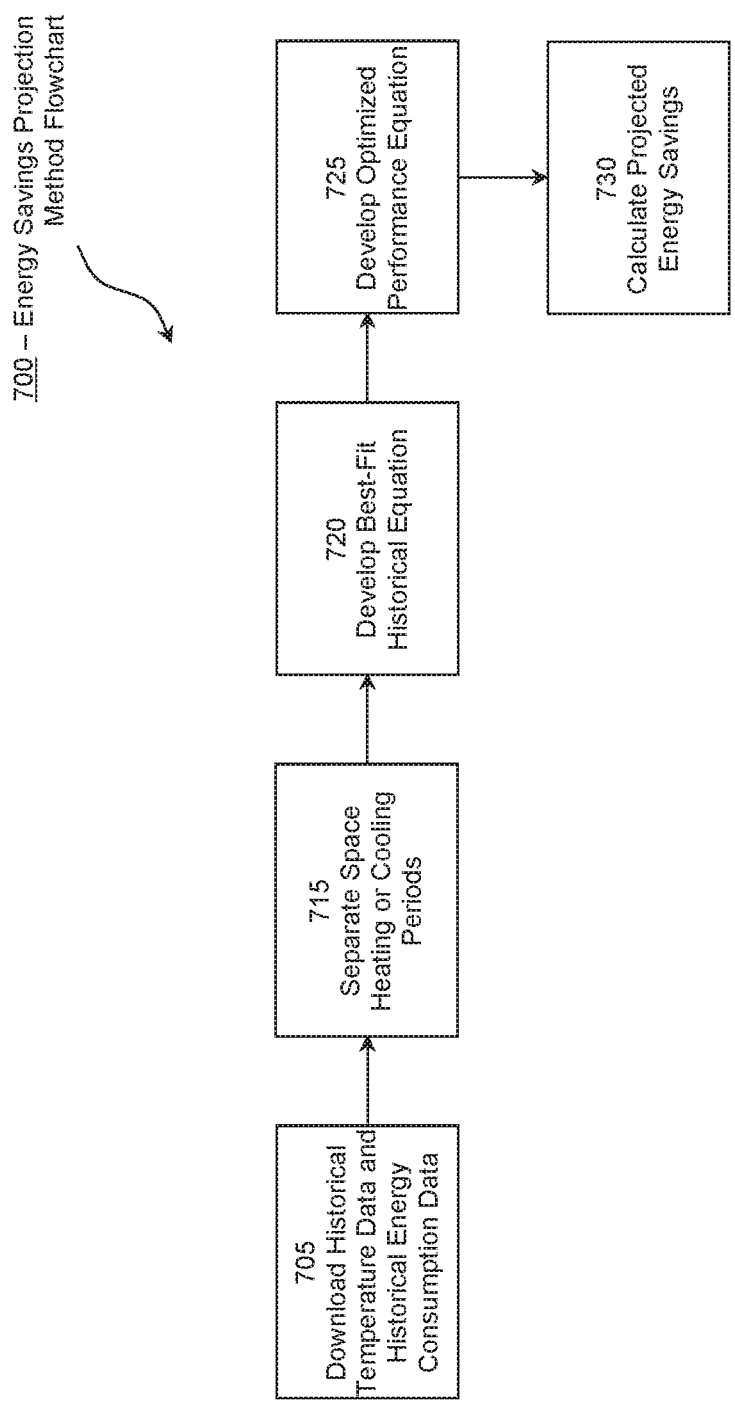
FIG. 7 provides a flowchart illustrating the method of projecting energy savings from Interval Data Optimization, according to an embodiment of the present invention.

Referring to FIG. 7, a method for projecting energy savings from Interval Data Optimization is represented in the form of a flow chart as indicated generally at 700. Method 700 can be performed using system 600, though it is understood that method 700 can be performed on variations of system 600, and likewise it is understood that method 700 can be varied to accommodate versions of system 600.

Method 700 involves using regression analysis to create a best fit trend line of the historical data. By comparing this to an optimized energy consumption target, this method can be used to identify and quantify the potential savings at a particular building. By comparing potential savings across a portfolio of buildings, this method can be used to identify the best opportunities for savings and conservation, and to prioritize an IDO-based energy conservation program.

Block 705 comprises downloading historical outdoor temperature and energy consumption data from their respective databases 630, 620 to the computing device 635. Typically, the outdoor temperature data and energy consumption data are interval data, averaged or totalized on a daily basis, although variations of the method using other data intervals (weekly, hourly, etc.) are contemplated.

The energy savings projection software 640 is used at block 715 to separate the space heating or cooling periods; at block 720 to develop a best-fit historical equation; at block 725 to develop an optimized performance equation; and at block 730 to calculate the projected energy savings. Input from the user 645 may be necessary to configure the software 640 and correct for data anomalies.

A typical energy savings projection method 700 utilizes a complete year (or heating season) of interval energy consumption and outdoor temperature data, although a shorter period can be used if limited data is available or specific anomalies make portions of the historical period inappropriate for use.

An example application of energy savings projection method 700 is illustrated by reference again to FIG. 3, which plots daily natural gas consumed (Y-axis) against mean daily outdoor temperature (X-axis).

The data points 310 (represented as hollow circles indicated at reference 310 in FIG. 3) show the historical daily energy consumption for a building with a conventional heating system control, prior to the implementation of IDO. Each point indicates one day of energy use. A dashed trend line 320 representing the best-fit to the historical energy consumption is calculated using simple linear regression analysis. The projected optimized heating system performance is represented by a solid black line 300 and is developed as detailed the earlier description of FIG. 3.

The area between the historical energy consumption trend line 320 and the optimal energy consumption rate line 300 represents the projected energy savings achievable by implementing system 100 and method 200, which can be calculated prior to their implementation. The projected energy savings for a given daily outdoor air temperature are calculated as the difference between historical energy consumption trend line 320 and the optimal energy consumption rate line 300 at that outdoor air temperature on the X-axis.

To calculate the potential savings for a typical year, an average daily operating temperature can be calculated which represents a typical day for the heating season. This average should exclude days where the outdoor air temperature is at or above the balance temperature, and the heating system should be off. The energy saving for the average day is then multiplied by the number of days in the heating season, to calculate the annual savings. The average day would be the same for any building of similar type within the same climatic zone. For example, in Toronto, Canada over the period from 2007 to 2016, the average temperature measured at Toronto Pearson International Airport from September to May (inclusive) has been about 2.7° C., not including days which are 16° C. or above. Over the last 10 years in Toronto, there has been an average of about 238 heating days per year from September 1 to May 30.

In the example shown in FIG. 3, using 2.7° C. as an average daily temperature 390 during the heating season, it can be seen that energy consumption is typically about 1626 $m^3$/day at that temperature, before implementation of IDO. On the other hand, using the optimal performance line, it can be seen that for the same temperature of about 2.7° C., the building energy consumption would be about 1197 $m^3$/day of gas. The difference between them represents a saving of 429 $m^3$/day of gas during a typical heating season day.

Given that there are typically about 238 days per year with heating in Toronto, Canada the total potential savings at this building are about 102,102 $m^3$/year of gas. Note that IDO typically offers the greatest potential savings during mild conditions, and so the bulk of the annual energy savings are actually achieved in the shoulder season months (September to November and April to May) and under mild conditions when they occur throughout the winter.

In addition to quantifying possible energy savings, method 700 can be used to identify particular heating system inefficiencies which can later be corrected through implementation of system 100. Referring again to FIG. 3, at 350 there is an example of a significant jump in energy consumption when the outdoor temperature drops below the balance temperature and the space heating system turns on. This jump, indicated at 350, represents about 730 $m^3$/day in wasted energy. Under these mild conditions the building is consuming more energy than required, and is in fact creating significant overheating. This behaviour is typical of many older multi-residential buildings with limited or no suite-level temperature control.

Method 700 can also be used to identify buildings where there is no automated heating system controller, or where the controller has malfunctioned or has been disabled. Often these buildings can be identified from a nearly horizontal arrangement of the historical data points 310 and historical energy consumption trend line 320 in FIG. 3.

Method 700 can also be applied across a portfolio of buildings to identify and prioritize the buildings where implementation of system 100 and method 200 are likely to yield the greatest energy savings. This process is more effective than comparing buildings based on standard benchmarking metrics such as energy consumption per square meter of floor area because it identifies the opportunity as being related to heating system control, which can be addressed with implementation of system 100 and method 200. Implementing system 100 and method 200 is typically a cost effective means of achieving energy savings in older multi-residential buildings.

The specific embodiments described in the preceding sections have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system for climate control of an environment in a building, the system comprising:
   a first loop for circulating a heating medium;
   a boiler disposed in the first loop, the boiler for providing heat to the heating medium;
   a second loop in thermal communication with the first loop, wherein the second loop circulates the heating medium for controlling a climate of the environment;
   a controller configured to control the boiler and to receive data from the first loop and the second loop, wherein the controller controls the boiler based on the data to maintain a temperature setpoint;
   an energy optimizer connected to the controller and configured to receive input from an energy meter, wherein the energy optimizer determines the temperature setpoint based on the input from the energy meter;
   an outdoor sensor in communication with the energy optimizer,
   wherein the outdoor sensor is configured to measure a temperature outside the building; and
   wherein the energy optimizer is configured to calculate an optimized energy rate setpoint which represents optimized performance of the system at the temperature outside the building, by
      determining an optimized system performance line based on a linear relationship of historical energy use between a balance temperature point and a design temperature point at a balance temperature and a design temperature, respectively,
      calculating the optimized energy rate setpoint from the optimized system performance line and the current outdoor temperature measured at the outdoor sensor,
      calculating a current energy consumption rate based on the input from the energy meter comparing the optimized energy rate setpoint and the current energy consumption rate,
      iteratively adjusting the temperature setpoint so as to reduce the difference between the current energy consumption rate and the optimized energy rate setpoint until an updated temperature setpoint is determined,
      storing a table of historical data containing resultant updated temperature setpoints and outside air temperatures, wherein in the event of system shut down and re-start sending an initial temperature setpoint to the controller based on said historical data for reducing the number of iterative adjustments of the temperature setpoint; and sending the updated temperature setpoint to the controller to control the boiler.

2. The system of claim 1, wherein the heating medium flows between the first loop and the second loop.

3. The system of claim 2, further comprising a valve configured to regulate flow of the heating medium between the first loop and the second loop.

4. The system of claim 3, wherein the valve is controlled by the controller.

5. The system of claim 1, wherein the energy optimizer adjusts the temperature setpoint to maintain a difference between the optimized energy rate setpoint and the input from the energy meter within a predetermined threshold.

6. The system of claim 5, wherein the energy optimizer is configured to determine a basic level of energy consumption, the basic level of energy consumption being subtracted from the difference.

7. The system of claim 1, further comprising a memory storage unit configured to store the table of historical data to the energy optimizer.

8. The system of claim 1, wherein said difference between the optimized energy consumption rate and the energy rate setpoint is reduced to about 5%.

9. A method of climate control of an environment in a building, the method comprising:
 circulating a heating medium in a first loop and a second loop, the second loop in thermal communication with the first loop, wherein the second loop circulates the heating medium for controlling a climate of the environment;
 wherein the second loop circulates the heating medium for controlling a climate of the environment;
 providing heat to the heating medium using a boiler disposed in the first loop;
 receiving data, at a controller, from the first loop and the second loop;
 controlling the boiler with the controller based on the data to maintain an initial temperature setpoint;
 receiving input from an energy meter at an energy optimizer;
 determining an updated temperature setpoint using the energy optimizer based on the input from the energy meter;
 calculating an optimized energy rate setpoint using the energy optimizer which represents optimized performance of the system at a current temperature outside the building by
  determining an optimized system performance line based on a linear relationship of historical energy use between a balance temperature point and a design temperature point at a balance temperature and a design temperature, respectively,
  calculating the optimized energy rate setpoint from the optimized system performance line and the current outdoor temperature measured at an outdoor sensor,
  calculating a current energy consumption rate based on the input from the energy meter, comparing the optimized energy rate setpoint and the current energy consumption rate,
 iteratively adjusting the temperature setpoint so as to reduce the difference between the current energy consumption rate and the optimized energy rate setpoint until an updated temperature setpoint is determined,
 storing a table of historical data containing resultant updated temperature setpoints and outside air temperatures, wherein in the event of system shut down and re-start sending an initial temperature setpoint to the controller based on said historical data for reducing the number of iterative adjustments of the temperature setpoint; and
 sending the updated temperature setpoint to the controller to control the boiler.

10. The method of claim 9, further comprising maintaining a difference between the optimized energy rate setpoint and the input from the energy meter within a predetermined threshold.

11. The method of claim 10, further comprising directing the heating medium to flow between the first loop and the second loop.

12. The method of claim 11, wherein directing comprises regulating flow of the heating medium between the first loop and the second loop using a valve.

13. The method of claim 12, further comprising directing controlling the valve using the controller.

14. The method of claim 10, further comprising subtracting a basic level of energy consumption from the difference.

15. The method of claim 9, further comprising measuring a temperature outside the building using an outdoor sensor, wherein the outdoor sensor is in communication with the energy optimizer.

16. The method of claim 9, wherein said difference between the optimized energy consumption rate and the energy rate setpoint is reduced to about 5%.

17. A non-transitory computer readable medium encoded with codes, the codes for directing a processor to operate a controller to:
 circulate a heating medium in a first loop and a second loop, the second loop in thermal communication with the first loop,
 wherein the second loop circulates the heating medium for controlling a climate of the environment provide heat to the heating medium using a boiler disposed in the first loop;
 receive data from the first loop and the second loop;
 control the boiler based on the data to maintain an initial temperature setpoint;
 receive input from an energy meter;
 determine an updated temperature setpoint based on the input from the energy meter;
 calculate an optimized energy rate setpoint using the energy optimizer which represents optimized performance of the system at a current temperature outside the building by
  determining an optimized system performance line based on a linear relationship of historical energy use between a balance temperature point and a design temperature point at a balance temperature and a design temperature, respectively,
  calculating the optimized energy rate setpoint from the optimized system performance line and the current outdoor temperature measured at an outdoor sensor,
  calculating a current energy consumption rate based on the input from the energy meter, comparing the optimized energy rate setpoint and the current energy consumption rate,
 iteratively adjusting the temperature setpoint so as to reduce the difference between the current energy consumption rate and the optimized energy rate setpoint until an updated temperature setpoint is determined,
 storing a table of historical data containing resultant updated temperature setpoints and outside air temperatures, wherein in the event of system shut down and re-start sending an initial temperature setpoint to the controller based on said historical data for reducing the number of iterative adjustments of the temperature setpoint; and controlling the boiler using the determined updated temperature setpoint.

18. The non-transitory computer readable medium of claim 17, wherein said difference between the optimized energy consumption rate and the energy rate setpoint is reduced to about 5%.

* * * * *